(12) United States Patent
Yonemochi et al.

(10) Patent No.: US 6,180,043 B1
(45) Date of Patent: Jan. 30, 2001

(54) METHOD OF IN-MOLD COATING

(75) Inventors: Kenji Yonemochi; Yoshiaki Yamamoto, both of Komaki (JP)

(73) Assignee: Dai Nippon Toryo Co., Ltd., Osaka (JP)

( * ) Notice: Under 35 U.S.C. 154(b), the term of this patent shall be extended for 0 days.

(21) Appl. No.: 09/235,766

(22) Filed: Jan. 25, 1999

(30) Foreign Application Priority Data

| Jan. 27, 1998 | (JP) | ................................................. 10-014239 |
| Aug. 31, 1998 | (JP) | ................................................. 10-245977 |

(51) Int. Cl.$^7$ ................................................................. B29C 45/14
(52) U.S. Cl. ..................... 264/255; 264/40.5; 264/328.7; 264/328.8
(58) Field of Search ............................... 264/255, 328.7, 264/328.8, 40.5; 425/130, 575

(56) References Cited

U.S. PATENT DOCUMENTS

| 4,082,486 | * | 4/1978 | Cerano et al. ................. 425/129 R |
| 4,668,460 | * | 5/1987 | Ongena ................................. 264/255 |
| 5,034,077 | * | 7/1991 | Pata ...................................... 156/84 |
| 5,044,309 | * | 9/1991 | Crumbach et al. .................. 118/419 |
| 5,174,933 | * | 12/1992 | Toh et al. ............................. 264/40.5 |
| 5,736,090 |   | 4/1998 | Yamamoto et al. ................ 264/255 |
| 5,902,534 | * | 5/1999 | Fujishiro et al. .................... 264/255 |

FOREIGN PATENT DOCUMENTS

05318527A * 12/1993 (JP) .

* cited by examiner

*Primary Examiner*—Jill L. Heitbrink
*Assistant Examiner*—Suzanne E. McDowell
(74) *Attorney, Agent, or Firm*—Oblon, Spivak, McClelland, Maier & Neustadt, P.C.

(57) ABSTRACT

A method of in-mold coating, comprising steps of forming a molded product by applying a clamping pressure to a mold to mold a synthetic resin molding material in the mold according to an injection molding method, an injection compression molding method or an injection press molding method, then coating a surface of the molded product with a coating material in the mold, wherein the coating material is injected in such a state that the molded product has cured or solidified to such an extent that the surface of the molded product can withstand an injection pressure and a flow pressure of the coating material, and the clamping of the mold after injection of the coating material is carried out under certain multistagewise variable clamping pressures with certain clamping pressure transitional periods of time.

4 Claims, 3 Drawing Sheets

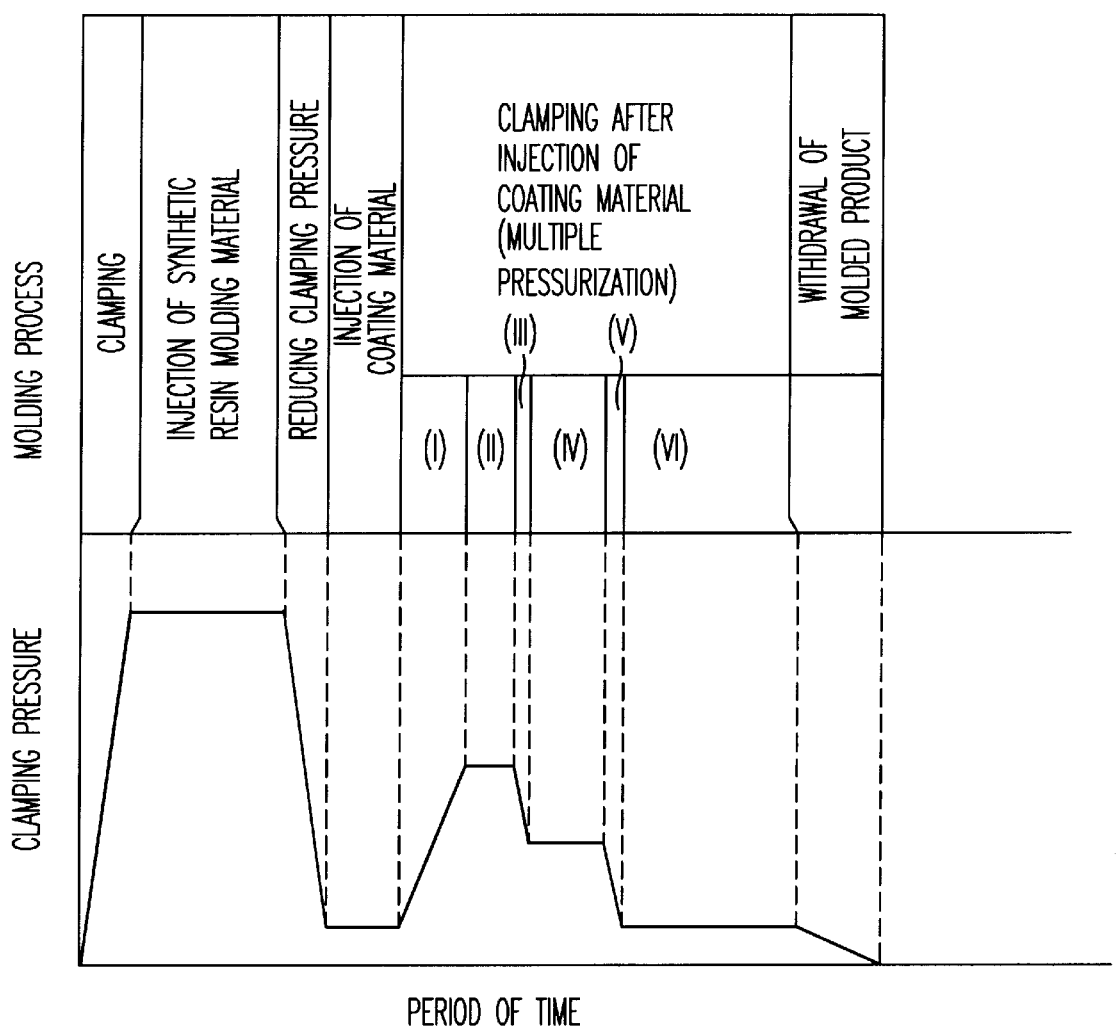

(I) CLAMPING PRESSURE TRANSITIONAL PERIOD OF TIME IN INITIAL STAGE (II) CLAMPING PRESSURE MAINTAINING PERIOD OF TIME IN INITIAL STAGE (III) CLAMPING PRESSURE TRANSITIONAL PERIOD OF TIME IN INTERMEDIATE STAGE (IV) CLAMPING PRESSURE MAINTAINING PERIOD OF TIME IN INTERMEDIATE STAGE (V) CLAMPING PRESSURE TRANSITIONAL PERIOD OF TIME IN FINAL STAGE (VI) CLAMPING PRESSURE MAINTAINING PERIOD OF TIME IN FINAL STAGE

FIG. 3

METHOD OF IN-MOLD COATING

The present invention relates to a method of in-mold coating, comprising steps of forming a molded product by molding a synthetic resin molding material in a mold according to an injection molding method, an injection compression molding method or an injection press molding method, and injecting a coating material into the mold to coat a surface of the molded product with the coating material.

Methods of in-mold coating have been utilized in order to improve the quality of a surface of molded products and to shorten a coating process. In particular, with respect to automobiles required to have appearance and quality at a high level, such methods have been widely applied to exterior plates and exterior parts of automobiles.

Such methods have been disclosed in U.S. Pat. No. 4,076,788, U.S. Pat. No. 4,081,578, U.S. Pat. No. 4,331,735, U.S. Pat. No. 4,366,109, U.S. Pat. No. 4,668,460, JP-A-5301251, JP-A-5318527 and JP-A-8142119 for example.

Although these publications refer to a clamping pressure and separation of mold halves with respect to injection of a coating material into between a surface of the mold and a surface of a molded product after having molded a synthetic resin molding material in the mold, the publications pay little attention to the clamping pressure after injection of the coating material, and the clamping pressure has been constant. A thick-walled portion such as a rib and a boss of the molded product is compressed by the clamping pressure after injection of the coating material, that is to say, by a pressure applied to the injected coating material. As a result, the coating material becomes thicker on such a thick-walled portion, and the coating material is cured in such a state. After that, the clamping pressure is released, and the coated molded product is removed out of the mold. The present inventors have found that, at the time of releasing the clamping pressure, the rib or the boss compressed by the coating material is likely to return to its original form by a spring back phenomenon to provide a rise as a defect on appearance. The inventors have verified that such a phenomenon is apt to occur in particular when the clamping pressure after injection of the coating material is high though the phenomenon is also affected by a degree of curing (solidification) or ease in elastic compression of the molded resin material on injection of the coating material.

It is an object of the present invention to provide a method of in-mold coating capable of preventing the rising phenomenon of a thick-walled portion of a molded product (the hump phenomenon) from occurring when a surface of the molded product is coated with a coating material in a mold after having molded a synthetic resin molding material in the mold according to an injection molding method, an injection compression molding method or an injection press molding method, and ensuring that the molded product thus coated has high quality, considering the circumstances stated earlier.

The present invention provides a method of in-mold coating, comprising steps of forming a molded product by applying a clamping pressure to a mold including a fixed mold half and a movable mold half to mold a synthetic resin molding material in the mold according to an injection molding method, an injection compression molding method or an injection press molding method, then reducing the clamping pressure or parting the fixed mold half and the movable mold half; injecting a coating material into between an inner surface of the mold and a surface of the molded product in the mold; and coating the surface of the molded product with the coating material, clamping the mold again; wherein (1) the coating material is injected in such a state that the molded product has cured or solidified to such an extent that the surface of the molded product can withstand an injection pressure and a flow pressure of the coating material; and (2) the clamping of the mold after injection of the coating material is carried out under certain multistagewise variable clamping pressures with certain clamping pressure transitional periods of time.

Examples of the synthetic resin molding material used in the present invention are thermosetting synthetic resin material such as SMC (Sheet Molding Compound) and BMC (Bulk Molding Compound) as fiber reinforced plastic containing a thermosetting resin such as unsaturated polyester resin as a matrix, a thermoplastic synthetic resin material such as polyethylene, polypropylene, acrylonitrile-butadiene-styrene copolymer, polycarbonate, polyamide, polyethylene terephthalate, polybutylene terephthalate and modified polyphenylene ether, alloy materials thereof, and the ones having fibers or scale-shaped fillers mixed.

As the coating material used in the present invention, various kinds of known coating materials for in-mold coating can be used. Typical examples of the coating material used in the present invention are ones disclosed in JP-A-5436369, JP-A-54139962, JP-A-5565511, JP-A-57140, JP-A-60212467, JP-A-60221437, JP-A-1229605, JP-A-570712, JP-A-5148375, JP-A-6107750 and JP-A-8113761 for example.

A particularly preferred example is a coating material which comprises a vehicle component comprising 20–70 wt % of an oligomer having at least two (meth)acrylate groups such as urethane acrylate oligomer and epoxy acrylate oligomer, or its resin or an unsaturated polyester resin thereof, and 80–30 wt % of an ethylenic unsaturated monomer copolymerizable therewith such as methyl(meth)acrylate, ethyl(meth)acrylate, propyl(meth)acrylate, butyl (meth)acrylate, 2-ethyl hexyl(meth)acrylate, (meth)acrylic acid, vinyl acetate and styrene; pigment; a polymerization initiator and so on. Two-pack coating materials such as an epoxy resin/polyamine curing system and a polyol resin/polyisocyanate curing system, of which the main agent and the curing agent are mixed immediately prior to injection into a mold, are also applicable.

In the drawings:

FIG. 3 is a graph to explain conditions of multistagewise variable clamping pressures, clamping pressure transitional periods of time and clamping pressure maintaining periods of time according to the present invention.

Figure 1:
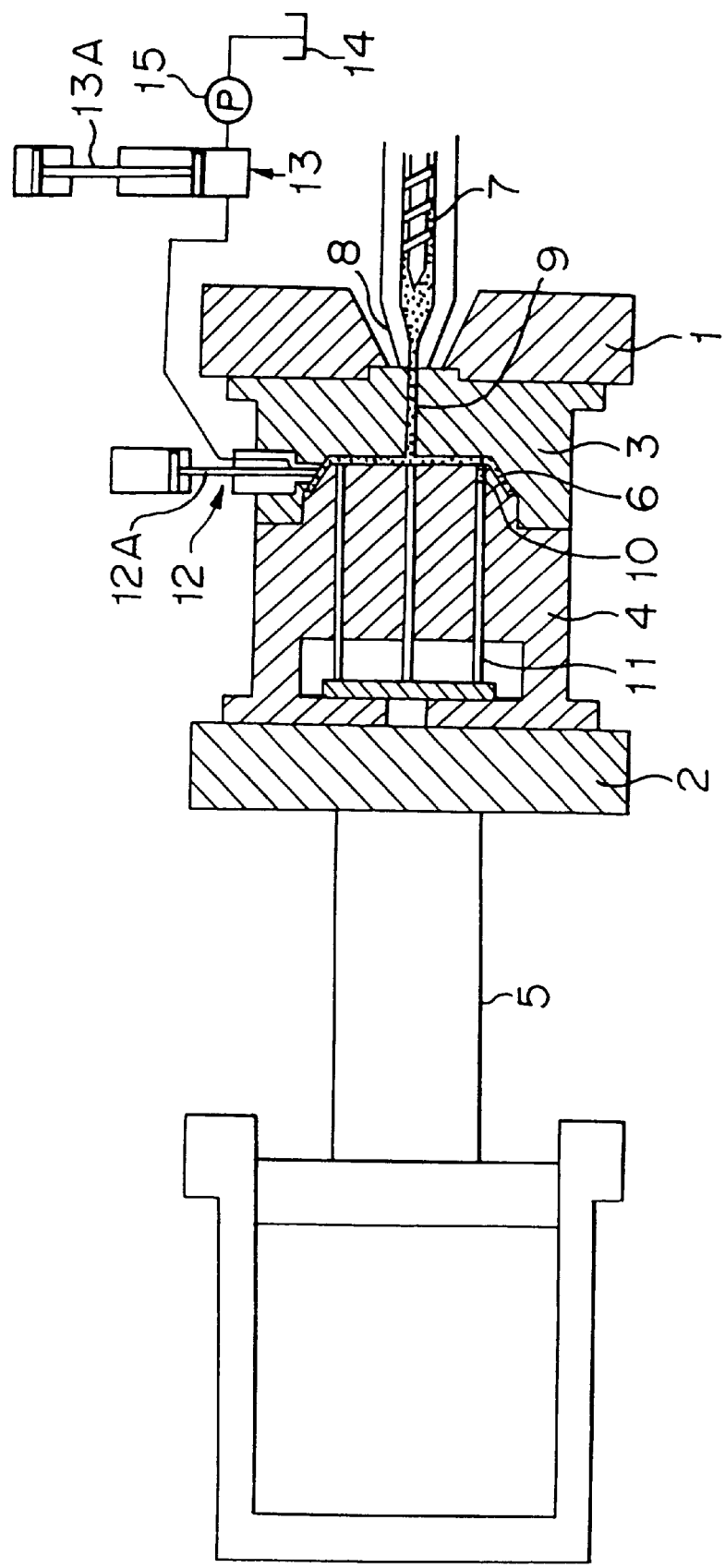
FIG. 1 is a schematic view of the injection molding apparatus and the mold according to an embodiment of the present invention.
Figure 2:
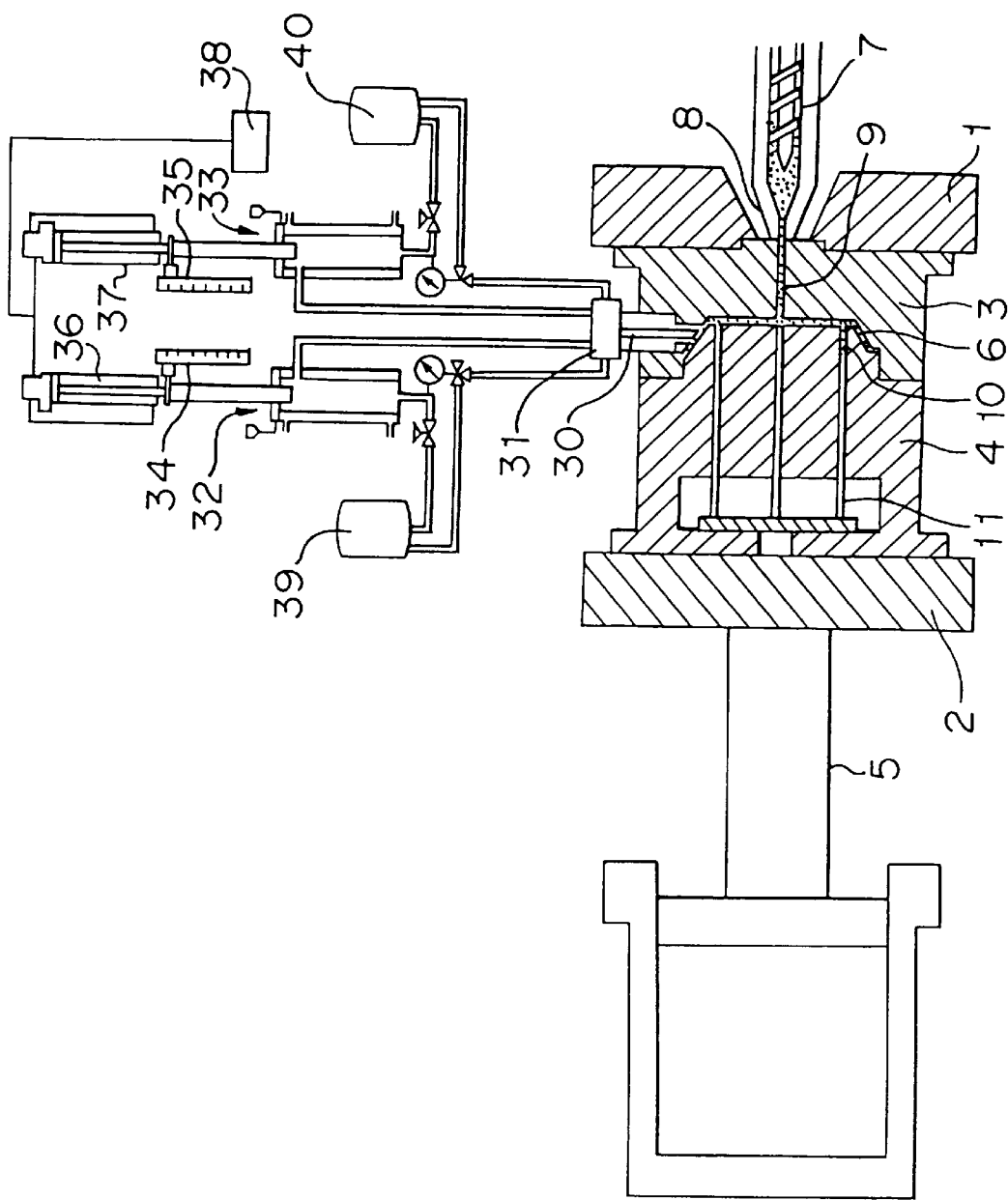
FIG. 2 is a schematic view of the injection molding apparatus and the mold according to another embodiment of the present invention.

Now, first and second embodiments of the injection molding apparatus and the mold to put the in-mold coating according to the present invention in practice will be specifically described, referring to FIGS. 1 and 2. In FIG. 1 respect to the first embodiment, reference numeral 1 designates a fixed plate of a clamping device in the injection molding apparatus, and reference numeral 2 designates a movable plate of the device. The fixed plate and the movable plate are respectively provided with a fixed mold half 3 and a movable mold half 4, which confront each other. The movable plate 2 is advanced and withdrawn by a clamping cylinder 5. The fixed mold half 3 and the movable mold half 4 provide a cavity 6 in a certain shape at engaged portions thereof. A synthetic resin molding material in a melted or softened state is injected and filled in the cavity, and the synthetic resin molding material cures or solidifies therein. When the melted synthetic resin molding material is injected and filled, the synthetic resin molding material is injected from an injection cylinder 7 with a screw therein into the cavity 6 through a nozzle 8 and a sprue 9. In this figure, reference numeral 10 designates a rib (boss), and reference numeral 11 designates an ejector pin for parting the mold halves.

The fixed mold half 3 and the movable mold half 4 have the engaged portions provided with a share edge structure. The share edge structure is formed with an engagement groove (not shown), in which an elastic sealing member such as an O-ring is engaged to improve a sealing property of the share edge structure to a coating material.

As an injection system for the coating material in the example shown in FIG. 1, there are provided an injector 12 with a shut-off pin 12A, a coating material metering cylinder 13 for supplying a certain amount of coating material to the injector 12, and a supply pump 15 for supplying the coating material into the metering cylinder 13 from a storing unit 14 for the coating material. The metering cylinder 13 is provided with a plunger-regulator 13A for injecting the coating material.

In order to mold the synthetic resin molding material to form a molded product, the clamping cylinder 5 is first activated to close the mold (the fixed mold half 3 and the movable mold half 4), and a clamping pressure is applied to the mold. The clamping pressure is required to counteract an injection pressure to the synthetic resin molding material. The injection pressure is normally as high as 400–2,500 kgf/cm$^2$ at the nozzle 8. During such process, the supply pump is activated to supply the required amount of coating material to the metering cylinder 13.

Next, the synthetic resin molding material in a melted or softened state is injected into the cavity 6 from the injection cylinder 7 through the nozzle 8. When the synthetic resin molding material has properly cured or solidified (to such an extent that the molded product can withstand an injection pressure and an flow pressure of the coating material), the clamping pressure is reduced, or the fixed mold half 3 and the movable mold half 4 are opened so that the engaged portions are not completely separated.

Next, the injector 12 activates the shut-off pin 12A to open an injection port thereof. Then, the plunger-regulator 13A in the metering cylinder 13 is activated to inject the coating material into the cavity 6, or into between an inner wall of the fixed mold half 3 and a surface of the molded product.

After the shut-off pin 12A is closed again, the clamping cylinder 5 is activated to clamp the mold, carrying out coating on the surface of the molded product in the mold.

When a coating material that thickens or gels due to reaction during storing as in the two-pack coating materials as stated earlier is used, it is required that injection of the coating material be carried out after the coating material has been prepared by mixing not less than two kinds of constituent agents (e.g., the main agent and the curing agent) immediately prior to injection into between the inner wall of the fixed mold half 3 and the molded product. In FIG. 2 is shown an apparatus for such a purpose as the second embodiment.

As an injection system for the coating material, there are provided a mixing head 31 with a piston 30 having a shut-off function and an injection function, and metering cylinders 32 and 33 for supplying certain amounts of constituent agents for the coating material to the mixing head. The respective metering cylinders have hydraulic cylinders 36 and 37 provided therein to apply a pressure to each of the constituent agents. The constituent agents are jetted through confronting nozzles (not shown) in the mixing head 31 and are collided together to be mixed, providing the target coating material. As other methods for mixing the constituent agents, there are a method using a static mixer, a method using a dynamic mixer and an atomizing method for instance. However, the method for mixing the constituent agents are not limited to these methods.

When the coating material is injected, a liquid main agent containing resin of a constituent agent for the coating material as a main component, and a liquid curing agent for curing the main agent are, respectively, subjected to temperature control in storing tanks 39 and 40 for the constituent agents, the liquid main agent and the liquid curing agent are pressurized at 50–200 bars by the hydraulic cylinders 36 and 37 in the metering cylinders 32 and 33, and the liquid main agent and the liquid curing agent are jetted through the confronting nozzles in the mixing head 31 to be mixed due to mutual impingement, providing the target coating material. The coating material is injected into between the inner wall of the fixed mold half 3 and the surface of the molded product by the piston 30 which works as a shut-off pin as well. When the coating material is prepared by mixing mutually reactive constituent agents immediately prior to injection as explained, the coating material has good fluidity on injection and is prevented from clogging since the coating material is free from thickening or gelation, which is different from use of a coating material prepared by preliminary mixing treatment.

After the coating material has been injected, the clamping cylinder 5 is activated to clamp the mold, accomplishing coating on the surface of the molded product in the mold.

In according with the present invention, the clamping speed and the clamping pressure of the clamping cylinder 5 after injection of the coating material are controlled by a proper controlling system to carry out the clamping process under different clamping pressures and different clamping speeds in a three-stage pattern as shown in FIG. 3 for instance, curing the coating material.

Although such proper clamping pressures and speeds (that is to say, proper clamping pressure transitional periods of time and proper clamping pressure maintaining periods of time) are slightly variable depending on the size and the shape of the cavity 6 or the kind of the coating material, it is preferable that the following conditions be met from the viewpoint that the rib or the boss is prevented from humping and the coated molded product has good quality:

INITIAL STAGE

It is preferable that the clamping pressure in an initial stage is 10–100 kgf/cm$^2$ with respect to a projected area of the molded product. It is preferable that the clamping pressure transitional period of time in the initial stage is 0.5–10 sec, and that the clamping pressure maintaining period of time in the initial stage is 0.5–20 sec. When the clamping pressure is lower than the range stated above, a uniform coating film is difficult to be formed on the entire surface of the molded product, and adhesion is apt to degrade. Conversely, when the clamping pressure is higher than the range, the humping prevention effect is apt to degrade.

When the clamping pressure transitional period of time is shorter than the range stated above, bubbles are apt to go into the coating material, and separation of pigment is apt to occur. Conversely, when the clamping pressure transitional period of time is longer than the range, wrinkles, cracks and so on are apt to be formed on the coating film.

When the clamping pressure maintaining period of time is shorter than the range stated above, the adhesion of coating film is apt to degrade. Conversely, when the clamping pressure maintaining period of time is longer than the range, the humping prevention effect is apt to degrade.

INTERMEDIATE STAGE

It is preferable that the clamping pressure in an intermediate stage is 20–80% of that in the initial stage, that the clamping pressure transitional period of time in the intermediate stage is 0.1–5 sec, and that the clamping pressure maintaining period of time in the intermediate stage is 0.5–20 sec.

When the clamping pressure is lower than the range stated above, bubbles are apt to be taken into the coating film due to reaction to an extended pressure difference between the initial stage and the intermediate stage, and wrinkles are also apt to be formed on the coating film. Conversely, when the clamping pressure is higher than the range, the humping prevention effect is apt to degrade.

When the clamping pressure transitional period of time is shorter than the range stated above, bubbles are apt to be taken into the coating film. Conversely, when the clamping pressure transitional period of time is longer than the range, wrinkles are apt to be formed on the coating film.

When the clamping pressure maintaining period of time is shorter than the range stated above, the adhesion of the coating film is apt to degrade.

FINAL STAGE

Clamping may be carried out under the same conditions as those on the intermediate stage in a final stage.

However, it is preferable that the clamping pressure in the final stage is lower than that in the initial stage and 40–200% of that in the intermediate stage, that the clamping pressure transitional period of time in the final stage is 0.1–5 sec, and that the clamping pressure maintaining period of time in the final stage is not less than 1 sec. Although there is no upper limit with respect to the clamping pressure maintaining period of time in the final stage, it is suitable that the clamping pressure maintaining period of time is 40–120 sec.

When the clamping pressure is lower than the range stated above, the adhesion of the coating film is apt to degrade. Conversely, when the clamping pressure is higher than the range, cracks are apt to be formed on the coating film when a molded product is taken out of the mold.

The clamping pressure transitional period of time and the clamping pressure maintaining period of time have a tendency similar to that explained with respect to the intermediate stage.

The critical factors in the embodiments are the presence of the multistagewise clamping pressures and the presence of the certain clamping pressure transitional periods of time after injection of the coating material, which are the conditions under which the rib or the boss on a molded product is prevented from rising (humping) to ensure high quality.

Now, the present invention will be further described in detail with reference to Examples. The scope of the present invention is not limited to these Examples.

EXAMPLE 1

The in-mold coating according to the present invention was applied to a mold which comprises a fixed mold half, a movable mold half and a cavity to form a molded product made of a synthetic resin molding material, the cavity having a box type of configuration of 200 mm in length, 150 mm in width and 10 mm in height, and a rib portion of 1 mm in width and 5 mm in depth. As the mold temperature, the fixed mold half 3 was set at a temperature of 120° C. and the movable mold half 4 was set at a temperature of 115° C. First, polyamide resin was filled in the injection cylinder 7 and was heated to 220–240° C. to be melted therein. A clamping pressure of 300 ton (1000 kgf/cm$^2$ with respect to a projected area of the molded product) was applied to the mold. The resin was injected into the mold thus clamped for about 4 sec. The resin was cooled for 10 sec to be solidified to such an extent that a surface of the molded product could withstand an injection pressure and a flow pressure of a coating material.

After the clamping pressure was reduced to 5 ton (17 kgf/cm$^2$ with respect to the projected area of the molded product), the coating material A that contains urethane acrylate oligomer and epoxy acrylate oligomer as main components (see Table 1) was measured to 3 cm$^3$ by the metering cylinder 13. Then, the coating material was injected into the cavity 6 in about 3 sec.

After completion of the injection, the clamping pressure was increased to 21 ton (70 kgf/cm$^2$ with respect to the projected area of the molded product) in 2 sec, and the increased clamping pressure was maintained for 5 sec. Next, the clamping pressure was reduced to 10 ton (33 kgf/cm$^2$ with respect to the projected area of the molded product) in 1 sec, and the reduced clamping pressure was maintained for 10 sec. Then, the clamping pressure was reduced to 5 ton (17 kgf/cm$^2$ with respect to the projected area of the molded product) in 1 sec, and the reduced clamping pressure was maintained for 60 sec, curing the coating material.

The rising amount of the rib portion on the molded product thus coated was checked by a sectional curve found by a surface texture measuring instrument (made by Tokyo Seimitsu Kabushiki Kaisha and commercially available under the trademark "SURFCOM").

It was checked that a hump of 1.5 $\mu$m was formed, which showed that the rib portion provided no uneven surface.

COMPARATIVE EXAMPLE 1

The process until the injection of the coating material was carried out under the same conditions as the Example 1. After completion of the injection, the clamping pressure was increased to 21 ton (70 kgf/cm with respect to a projected area of a similar molded product) in 2 sec, and the increased clamping pressure was maintained for 75 sec to cure the coating material.

The rising amount of the rib portion on the molded product thus coated was 20.0 $\mu$m, which showed that the rib portion provided a poor surface in terms of uniformity.

EXAMPLE 2

A mold included a cavity to form a molded product made of a synthetic resin molding material in a wheel cover form, the cavity having a configuration of 370 mm in diameter and a rib portion of 1.8 mm in width and 50 mm in depth. The fixed mold half 3 was set at a temperature of 120° C. and the movable mold half 4 was set at a temperature of 115° C. First, modified polyphenylene ether resin was filled in the injection cylinder and was heated to 250–270° C. to be melted therein. A clamping pressure of 500 ton (500 kgf/cm$^2$ with respect to a projected area of the molded product) was applied to the mold. The resin was injected into the mold thus clamped for about 5 sec. The resin was cooled for about 20 sec to be solidified to such an extent that a surface of the molded product could withstand an injection pressure and a flow pressure of a coating material.

After the clamping pressure was reduced to 10 ton (10 kgf/cm$^2$ with respect to the projected area of the molded product), the coating material B that contains urethane acrylate oligomer as a main component (see Table 1) was measured to 10 cm³ by the metering cylinder 13. Then, the coating material was injected into the cavity 6 in about 4 sec.

After completion of the injection, the clamping pressure was increased to 40 ton (40 kgf/cm² with respect to the projected area of the molded product) in 5 sec, and the increased clamping pressure was maintained for 2 sec. Next, the clamping pressure was reduced to 20 ton (20 kgf/cm² with respect to the projected area of the molded product) in 2 sec, and the reduced clamping pressure was maintained for 70 sec, curing the coating material.

It was checked that the rising amount of the rib portion on the molded product thus coated was 1.0 µm, which showed that the rib portion provided no uneven surface.

EXAMPLE 3

A mold included a cavity to form a molded product made of a synthetic resin molding material, the cavity having a box type of 200 mm in length, 150 mm in width and 10 mm in height. The fixed mold half 3 was set at a temperature of 155° C. and the movable mold half 4 was set at a temperature of 160° C. First, a molding material called BMC containing unsaturated polyester resin as a matrix was injected into the mold to which a clamping pressure of 300 ton (1000 kgf/cm² with respect to a projected area of the molded product) was applied. The resin was cured for 60 sec.

After the clamping pressure was reduced to 5 ton (17 kgf/cm² with respect to the projected area of the molded product), the coating material C that contains urethane acrylate oligomer and epoxy acrylate oligomer as main components (see Table 1) was measured to 3 cm³ by the metering cylinder 13. Then, the coating material was injected into the cavity 6 in about 3 sec.

After completion of the injection, the clamping pressure was increased to 21 ton (70 kgf/cm² with respect to the projected area of the molded product) in 1 sec, and the increased clamping pressure was maintained for 6 sec. Next, the clamping pressure was reduced to 10 ton (33 kgf/cm² with respect to the projected area of the molded product) in 1 sec, and the reduced clamping pressure was maintained for 5 sec. Then, the clamping pressure was increased to 15 ton (50 kgf/cm² with respect to the projected area of the molded product) in 1 sec, and the increased clamping pressure was maintained for 50 sec, curing the coating material.

It was checked that the rising amount of the rib portion on the molded product thus coated was 1.5 µm, which showed that the rib portion provided no uneven surface.

EXAMPLE 4

The in-mold coating according to the present invention was applied to a mold which comprises a fixed mold half, a movable mold half and a cavity to form a molded product made of a synthetic resin molding material in a wheel cover form, the cavity having a configuration of 370 mm in diameter, and a rib portion of 1.8 mm in width and 50 mm in depth. As the mold temperature, the fixed mold half 3 was set at a temperature of 120° C. and the movable mold half 4 was set at a temperature of 115° C. First, modified polyphenylene ether resin was filled in the injection cylinder 7 and was heated to 250–270° C. to be melted therein. A clamping pressure of 500 ton (500 kgf/cm² with respect to a projected area of the molded product) was applied to the mold. The resin was injected into the mold thus clamped for about 5 sec. The resin was cooled for 30 sec to be solidified to such an extent that a surface of the molded product could withstand an injection pressure and a flow pressure of a coating material.

After the fixed mold half and the movable mold half were parted by 0.5 mm, the coating material D that contains urethane acrylate oligomer as a main component (see Table 1) was measured to 10 cm³ by the metering cylinder 13. Then, the coating material was injected into the cavity 6 in about 2 sec.

After completion of the injection, the clamping pressure was increased to 20 ton (20 kgf/cm² with respect to the projected area of the molded product) in 8 sec, and the increased clamping pressure was maintained for 2 sec. Next, the clamping pressure was reduced to 10 ton (10 kgf/cm² with respect to the projected area of the molded product) in 2 sec, and the reduced clamping pressure was maintained for 5 sec. Then, the clamping pressure was increased to 15 ton (15 kgf/cm² with respect to the projected area of the molded product) in 1 sec, and the increased clamping pressure was maintained for 80 sec, curing the coating material.

It was checked that the rising amount of the rib portion on the molded product thus coated was 1.5 µm, which showed that the rib portion provided no uneven surface.

TABLE 1

Coating material

| Type of coating material | A | B | C | D |
| --- | --- | --- | --- | --- |
| | | | (Parts by weight) | |
| Urethane acrylate oligomer (1) | 10.0 | — | 16.0 | — |
| Urethane acrylate oligomer (2) | — | 55.0 | — | 54.0 |
| Epoxy acrylate oligomer | 20.0 | — | 16.0 | — |
| 1,6-Hexane diol diacrylate | — | 45.0 | — | 36.0 |
| Styrene | 24.0 | — | 22.0 | — |
| Titanium dioxide | 45.0 | — | 45.0 | — |
| Aluminum pigment (average particle diameter: 30 µm) | — | 3.0 | — | — |
| Aluminum pigment (average particle diameter: 22 µm) | — | — | — | 8.0 |
| Zinc stearate | 0.5 | 1.0 | 0.5 | 0.8 |
| TINUVIN 292 | — | 1.0 | — | — |
| TINUVIN 1130 | — | 0.5 | — | — |
| 8% Cobalt octoate | 0.5 | 0.5 | 0.1 | 0.2 |
| t-Butylperoxy benzoate | 0.5 | — | 1.5 | 0.2 |
| t-Amylperoxy-2-ethyl hexanoate | 0.5 | 0.5 | — | 0.8 |

Urethane acrylate oligomer (1): MW (Average Molecular weight) = 2,500
Urethane acrylate oligomer (2): MW = 6,500
Epoxy acrylate oligomer: MW = 540
TINUVIN 292, TINUVIN 1130: Ultraviolet radiation absorbent, trademark of Chiba-Geigy Ltd.

EXAMPLE 5

The in-mold coating according to the present invention was applied to a mold which includes a cavity to form a molded product made of a synthetic resin molding material in a box form, the cavity having a configuration of 300 mm in length, 300 mm in width and 30 mm in height, and a boss portion of 6 mm in diameter and 8 mm in depth. As the mold temperature, the fixed mold half 3 and the movable mold half were set at a temperature of 70° C. First, ABS resin was filled in the injection cylinder 7 and was heated to 220–240° C. to be melted therein. A clamping pressure of 550 ton (610 kgf/cm² with respect to a projected area of the molded product) was applied to the mold. The resin was injected into the mold thus clamped for about 4 sec. The resin was cooled for 20 sec to be solidified to such an extent that a surface of the molded product could withstand an injection pressure and a flow pressure of a coating material.

After the clamping pressure was reduced to 5 ton, 10cm³ of a composition as the coating material that was prepared by mixing the liquid A containing polyester polyol as a main component and the liquid B containing polyisocyanate with 1:1 volume ratio (see Table 2) in the mixing device shown in FIG. 2 was injected into between an inner surface of the fixed mold half and a surface of the molded product in about 2 sec.

After completion of the injection, the clamping pressure was increased to 81 ton (90 kgf/cm² with respect to the projected area of the molded product) in 2 sec, and the increased clamping pressure was maintained for 5 sec. Next, the clamping pressure was reduced to 20 ton (22 kgf/cm² with respect to the projected area of the molded product) in 2 sec, and the reduced clamping pressure was maintained for 10 sec. Then, the clamping pressure was increased to 30 ton (33 kgf/cm² with respect to the projected area of the molded product) in 1 sec, and the increased clamping pressure was maintained for 60 sec, curing the coating material.

It was checked that the rising amount of the boss portion on the molded product thus coated was 2.0 μm, which showed that the boss portion provided no uneven surface.

COMPARATIVE EXAMPLE 2

The process until the injection of the coating material was carried out under the same conditions as the Example 5. Next, the clamping pressure after the injection of the coating material was increased to 81 ton (90 kgf/cm² with respect to a projected area of a similar molded product) in 2 sec, and the increased clamping pressure was maintained for 75 sec.

It was checked that the rising amount of the boss portion on the molded product thus coated was 45 μm, which showed that the boss portion provided a poor surface in terms of uniformity.

TABLE 2

|  | (Parts by weight) | |
| --- | --- | --- |
| Coating material | Liquid A | Liquid B |
| DESMOPHEN TPLS 2136 | 40.00 | — |
| DESMOPHEN TPLS 2137 | 27.00 | — |
| Dibutyl tin dilaurate | 0.06 | — |
| Titanium dioxide | 30.00 | — |
| ZELEC NE | 1.00 | — |
| TINUVIN 292 | 1.00 | — |
| TINUVIN 1130 | 0.50 | — |
| DESMODUR TPLS 2098 | — | 100.00 |

DESMOPHEN TPLS 2136, DESMOPHEN TPLS 2137: Polyester polyol (Trademark of Bayer AG)
ZELEC NE: Neutral phosphate-alcohol (Trademark of Du Pont)
DESMODUR TPLS 2098: Hexamethylene diisocyanate prepolymer (Trademark of Bayer AG)

EXAMPLE 6

The in-mold coating according to the present invention was applied to a mold which includes a cavity to form a molded product made of a synthetic resin molding material in a box form, the cavity having a configuration of 300 mm in length, 300 mm in width and 30 mm in height, and a boss portion of 6 mm in diameter and 8 mm in depth. As the mold temperature, the fixed mold half 3 was set at a temperature of 120° C. and the movable mold half were set at a temperature of 115° C. First, polyamide resin was filled in the injection cylinder 7 and was heated to 220–240° C. to be melted therein. A clamping pressure of 550 ton (610 kgf/cm² with respect to a projected area of the molded product) was applied to the mold. The resin was injected into the mold thus clamped for about 4 sec. The resin was cooled for 10 sec to be solidified to such an extent that a surface of the molded product could withstand an injection pressure and a flow pressure of a coating material.

After the clamping pressure was reduced to 5 ton (5 kgf/cm² with respect to the projected area of the molded product), 10 cm³ of a composition as the coating material that was prepared by mixing the liquid C containing urethane acrylate oligomer and curing accelerator as main components and the liquid D containing urethane acrylate oligomer and peroxide as main components with 1:1 volume ratio (see Table 3) was injected into between an inner surface of the fixed mold half and a surface of the molded product in about 2 sec.

After completion of the injection, the clamping pressure was increased to 63 ton (70 kgf/cm² with respect to the projected area of the molded product) in 5 sec, and the increased clamping pressure was maintained for 5 sec. Next, the clamping pressure was reduced to 30 ton (33 kgf/cm² with respect to the projected area of the molded product) in 1 sec, and the reduced clamping pressure was maintained for 20 sec. Then, the clamping pressure was further reduced to 20 ton (22 kgf/cm² with respect to the projected area of the molded product) in 1 sec, and the increased clamping pressure was maintained for 60 sec, curing the coating material.

It was checked that the rising amount of the boss portion on the molded product thus coated was 1.0 μm, which showed that the boss portion provided no uneven surface.

TABLE 3

|  | (Parts by weight) | |
| --- | --- | --- |
| Coating material | Liquid C | Liquid D |
| Urethane acrylate oligomer | 33.0 | 33.0 |
| Tripropyleneglycol diacrylate | 27.0 | 27.0 |
| Titanium dioxide | 27.0 | 27.0 |
| Zinc stearate | 0.6 | 0.6 |
| 8 wt % Cobalt octoate | 1.0 | — |
| Butyl hydroxy toluene | — | 0.3 |
| t-Amylperoxy-2-ethyl hexanoate | — | 1.0 |

Urethane acrylate oligomer: Mw = 2,500

What is claimed is:

1. A method of in-mold coating, comprising steps of:
    forming a molded product by applying a clamping pressure to a mold including a fixed mold half and a movable mold half to mold a synthetic resin molding material in the mold according to an injection molding method, an injection compression molding method or an injection press molding method;
    then reducing the clamping pressure to a reduced pressure value or parting the fixed mold half and the movable mold half;
    injecting a coating material into a space formed between an inner surface of the mold and a surface of the molded product in the mold; and
    coating the surface of the molded product with the coating material, clamping the mold again,
    wherein the coating material is injected in such a state that the molded product has cured or solidified to such an extent that the surface of the molded product can withstand an injection pressure and a flow pressure of the coating material,
    wherein the clamping of the mold after injection of the coating material is carried out such that the clamping pressure is changed from the reduced pressure value to and maintained at a first pressure value and then further changed from the first pressure value to and maintained at a second pressure value, wherein the clamping of the mold after the injection of the coating material is carried out such that the clamping pressure is further changed from the second pressure value to and maintained at a third pressure value, wherein the first pressure value is 10 $Kgf/cm^2$–100 $Kgf/cm^2$ with respect to a projected area of the molded product, a clamping pressure transitional period of time during which the clamping pressure is changed from the reduced pressure value to the first pressure value is 0.5 sec–10 sec and a clamping pressure maintaining period of time during which the clamping pressure is maintained at the first pressure value is 0.5 sec–20 sec in an initial stage, wherein the second pressure value is 20%–80% of the first pressure value, a clamping pressure transitional period of time during which the clamping pressure is changed from the first pressure value to the second pressure value is 0.1 sec–5 sec and a clamping pressure maintaining period of time during which the clamping pressure is maintained at the second pressure value is 0.5 sec–20 sec in an intermediate stage, and wherein the third pressure value is lower than the first pressure value in the initial stage, and 40%–200% of the second pressure value in the intermediate stage, a clamping pressure transitional period of time during which the clamping pressure is changed from the second pressure value to the third pressure value is 0.1 sec–5 sec and a clamping pressure maintaining period of time during which the clamping pressure is maintained at the third pressure value is not less than 1 sec in a final stage.

2. A method of in-mold coating according to claim 1, wherein the mold has a shear edge structure.

3. A method of in-mold coating according to claim 2, wherein there is provided a mixer, the coating material is prepared by mixing not less than two kinds of constituent agents in the mixer immediately prior to injection of the coating material, and the coating material thus prepared is injected into between the inner surface of the mold and the surface of the molded product.

4. A method of in-mold coating according to claim 1, wherein there is provided a mixer, the coating material is prepared by mixing not less than two kinds of constituent agents in the mixer immediately prior to injection of the coating material, and the coating material thus prepared is injected into between the inner surface of the mold and the surface of the molded product.

* * * * *